US009827904B2

United States Patent
Modarres et al.

(10) Patent No.: US 9,827,904 B2
(45) Date of Patent: Nov. 28, 2017

(54) SYSTEMS AND METHODS FOR ENHANCED CONTINUOUS AWARENESS IN VEHICLES USING HAPTIC FEEDBACK

(71) Applicant: IMMERSION CORPORATION, San Jose, CA (US)

(72) Inventors: Ali Modarres, San Jose, CA (US); Juan Manuel Cruz-Hernandez, Montreal (CA); Danny A. Grant, Laval (CA); Neil Olien, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/518,769

(22) Filed: Oct. 20, 2014

(65) Prior Publication Data

US 2016/0107570 A1   Apr. 21, 2016

(51) Int. Cl.
*B60Q 1/00* (2006.01)
*B60Q 9/00* (2006.01)
*B60W 50/16* (2012.01)
*B62D 15/02* (2006.01)
*B60N 2/44* (2006.01)

(52) U.S. Cl.
CPC .............. *B60Q 9/008* (2013.01); *B60W 50/16* (2013.01); *B62D 15/029* (2013.01); *B60N 2002/4485* (2013.01); *B60W 2520/00* (2013.01); *B60W 2540/00* (2013.01); *B60W 2550/00* (2013.01)

(58) Field of Classification Search
CPC ........ G08B 6/00; G08B 21/0407; B60N 2/44; B60Q 1/00; B60Q 9/008
USPC .............................. 340/435, 901, 407.1, 4.12
See application file for complete search history.

(56) References Cited

U.S. PATENT DOCUMENTS

| | | | |
|---|---|---|---|
| 7,124,027 B1 * | 10/2006 | Ernst, Jr. ............... | B60W 30/09 340/435 |
| 7,245,231 B2 * | 7/2007 | Kiefer ..................... | G08G 1/16 340/407.1 |
| 8,942,892 B2 * | 1/2015 | Veen ................... | B60N 2/0232 297/217.3 |
| 9,290,125 B2 * | 3/2016 | Nagata .................. | B60Q 9/008 |
| 2007/0244641 A1 | 10/2007 | Altan et al. | |
| 2009/0284360 A1 | 11/2009 | Litkouhi | |
| 2012/0126965 A1 | 5/2012 | Sanma et al. | |

(Continued)

FOREIGN PATENT DOCUMENTS

DE   10 2007 15432 A1   10/2008
DE   10 2009 011580 A1   9/2010

OTHER PUBLICATIONS

European Search Report, European Application No. 15190318.4, dated Apr. 5, 2016.

(Continued)

*Primary Examiner* — Toan N Pham
(74) *Attorney, Agent, or Firm* — Medler, Ferro, Woodhouse & Mills PLLC

(57) ABSTRACT

A system for a vehicle includes a sensor configured to sense information associated with the vehicle's surroundings, environment and/or condition and output a sensor signal based on the sensed information, a processor configured to receive the sensor signal, determine haptic feedback for the system to display based on the sensor signal, and output a haptic control signal, and a haptic output device configured to receive the haptic control signal from the processor and generate the haptic feedback to a driver of the vehicle based on the haptic control signal.

24 Claims, 13 Drawing Sheets

(56) References Cited

U.S. PATENT DOCUMENTS

| | | | | |
|---|---|---|---|---|
| 2013/0341977 A1* | 12/2013 | Kiefer | ................... | B60N 2/448 297/217.3 |
| 2014/0346823 A1* | 11/2014 | Stebbins | ................ | B60Q 9/008 297/217.1 |
| 2015/0175172 A1* | 6/2015 | Truong | ................ | B60W 50/10 701/36 |

* cited by examiner

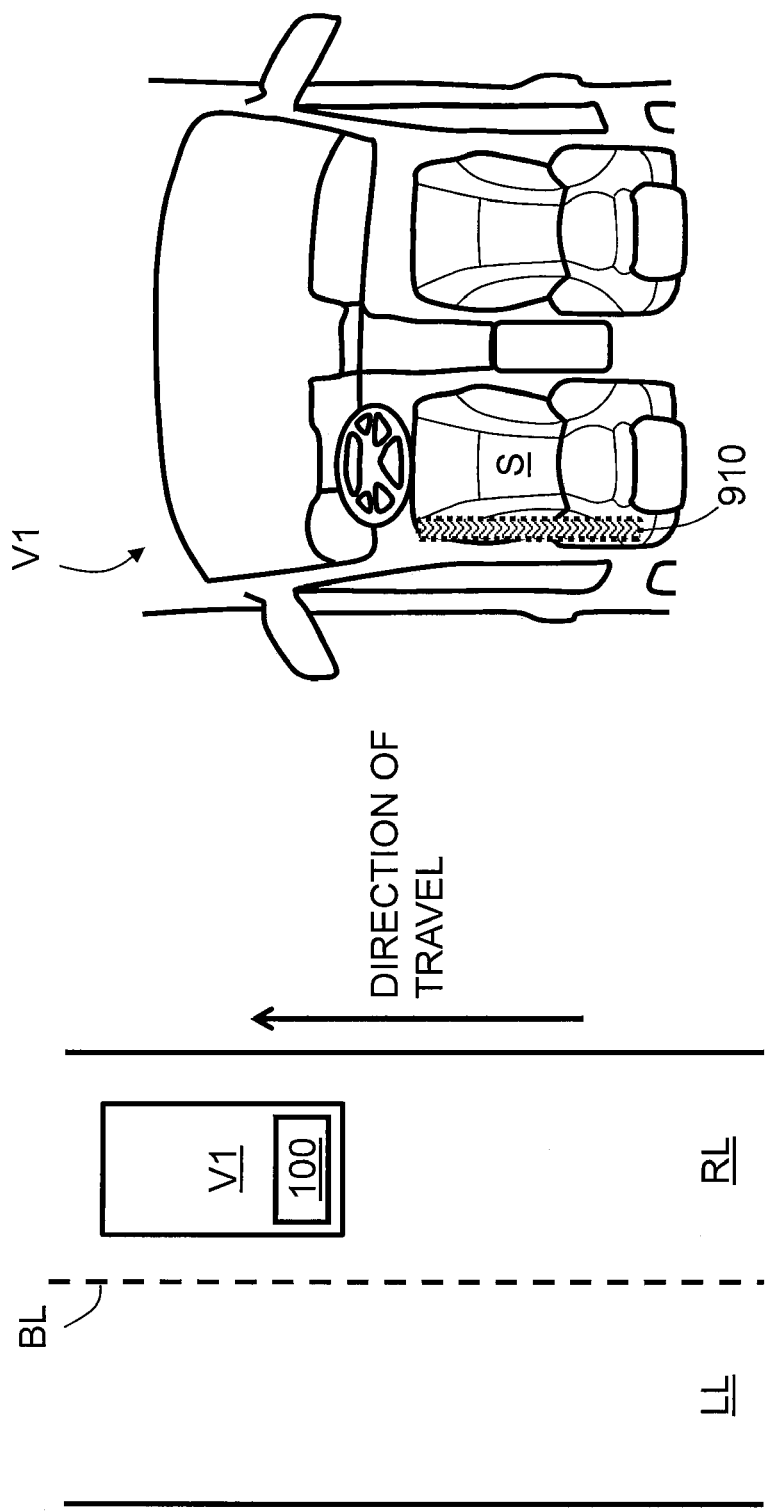

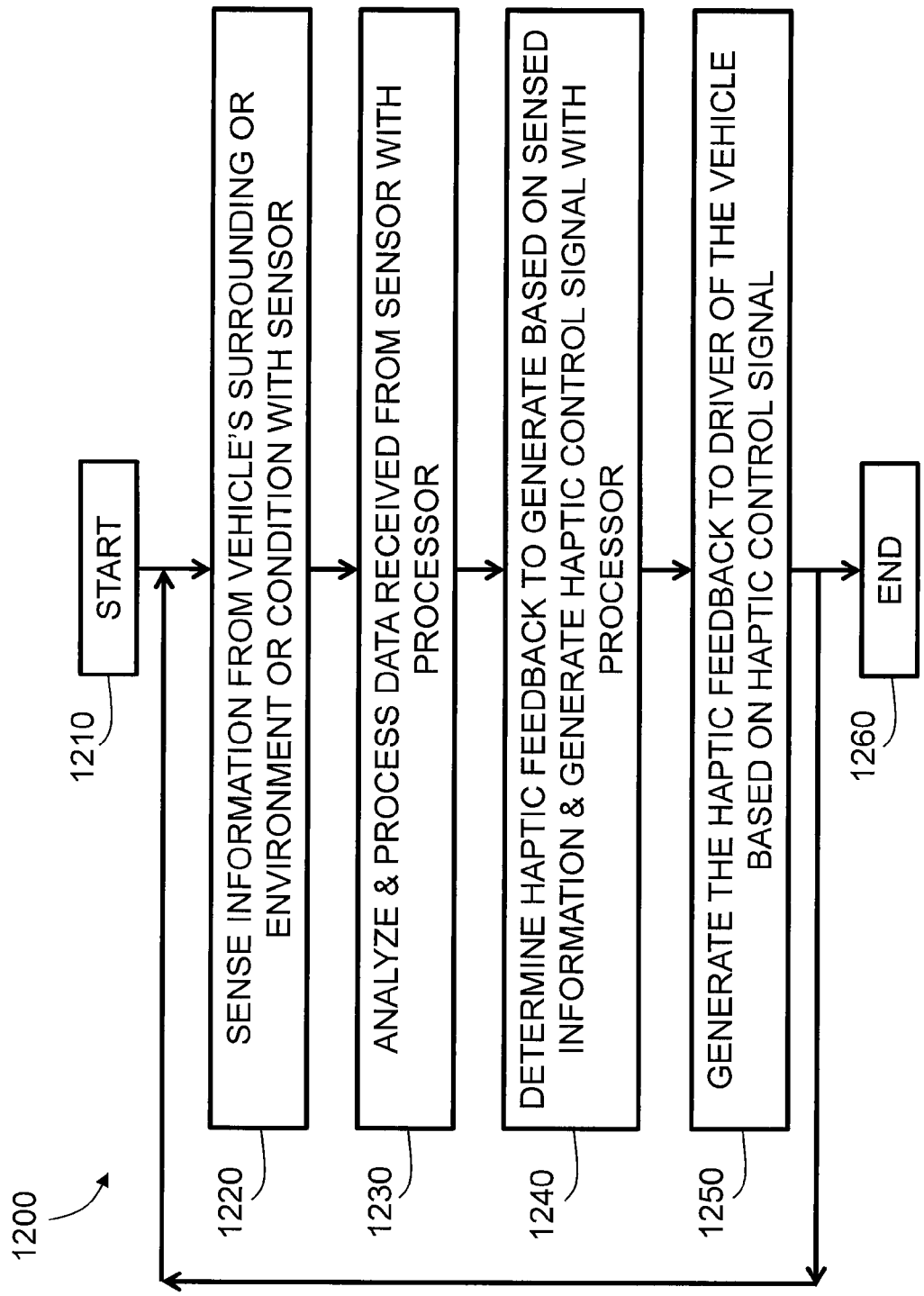

SYSTEMS AND METHODS FOR ENHANCED CONTINUOUS AWARENESS IN VEHICLES USING HAPTIC FEEDBACK

FIELD

The present invention is directed to systems and methods for enhanced continuous awareness in vehicles using haptic feedback.

BACKGROUND

Intelligent vehicles equipped with sophisticated sensory systems provide access to information about driving conditions and surroundings beyond what is available to the driver. Continuous awareness of and access to such data can significantly improve the safety of the driver and passengers. However, displaying such data using visual, audio, or basic vibrotactile feedbacks may be ineffective and difficult to convey the information accurately, may cognitively overload the driver and/or become annoying after a while, and the advancement of technology and automation in vehicles has in many cases removed the need for drivers to pay close attention to the surroundings of the vehicles. A driver that is disconnected from road conditions, the vehicle's dynamics, and surrounding cars may not react as quickly to retain control in case an urgent situation that requires the driver's intervention arises.

Distraction from the surroundings is one of the key reasons behind car accidents. Even momentary interruption of attention in situations when the driver's full awareness is required may significantly increase the chance of an incident.

SUMMARY

It is desirable to increase a driver's awareness of the driving conditions and surroundings in a continuous yet intuitive manner to thereby improve the driver's capability to react to urgent situations more effectively.

According to an aspect of the invention, a system for a vehicle is provided. The system includes a sensor configured to sense information associated with the vehicle's surroundings, environment and/or condition and output a sensor signal based on the sensed information, a processor configured to receive the sensor signal, determine haptic feedback for the system to display based on the sensor signal, and output a haptic control signal, and a haptic output device configured to receive the haptic control signal from the processor and generate the haptic feedback to a driver of the vehicle based on the haptic control signal.

In an embodiment, the haptic output device is located in a seat of the driver of the vehicle.

In an embodiment, the information sensed by the sensor comprises a location of a second vehicle relative to the vehicle. In an embodiment, the haptic feedback includes kinesthetic feedback that moves within the seat to indicate the location of the second vehicle relative to the vehicle.

In an embodiment, the information sensed by the sensor includes a location of a marker on a road on which the vehicle is travelling relative to the vehicle. In an embodiment, the haptic feedback includes kinesthetic feedback that moves within the seat to indicate the location of the marker on the road relative to the vehicle.

In an embodiment, the haptic output device is located at a steering wheel of the vehicle. In an embodiment, the haptic output device is configured to cause a deformation or change of stiffness of the steering wheel for the haptic feedback.

In an embodiment, the haptic output device is located at a seat belt of the driver. In an embodiment, the haptic feedback comprises kinesthetic feedback and/or vibrotactile feedback.

According to an aspect of the invention, there is provided a method that includes sensing information from a vehicle's surroundings, environment and/or condition with at least one sensor, determining haptic feedback to generate to a driver of the vehicle based on the information sensed by the sensor and generating a haptic control signal with a processor, and generating the haptic feedback to the driver with a haptic output device based on the haptic control signal received from the processor.

In an embodiment, the haptic feedback includes kinesthetic feedback.

In an embodiment, the haptic feedback includes vibrotactile feedback.

According to an aspect of the invention, there is provided a vehicle that includes a driver's seat, a seat belt, a steering wheel, and a system for providing haptic feedback to a driver of the vehicle. The system includes a sensor configured to sense information associated with the vehicle's surroundings, environment and/or condition and output a sensor signal based on the sensed information, a processor configured to receive the sensor signal, determine haptic feedback for the system to display based on the sensor signal, and output a haptic control signal, and a haptic output device configured to receive the haptic control signal from the processor and generate the haptic feedback to the driver of the vehicle based on the haptic control signal.

In an embodiment, the haptic output device is configured to generate kinesthetic feedback.

In an embodiment, the system further includes a second haptic output device that is configured to generate vibrotactile feedback.

In an embodiment, the haptic output device is located in the driver's seat.

In embodiment, the haptic output device is located in the steering wheel.

In an embodiment, the haptic output device is operatively connected to the seat belt. In an embodiment, the haptic output device is part of a tensioning mechanism for the seat belt and is configured to generate kinesthetic feedback. In an embodiment, the haptic output device is embedded within the seat belt and is configured to generate vibrotactile feedback.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIGS. 7A-9B schematically illustrate an implementation of the system of FIG. 1;

FIG. 12 schematically illustrates a flow chart of a method according to an embodiment of the invention.

DETAILED DESCRIPTION

Figure 1:
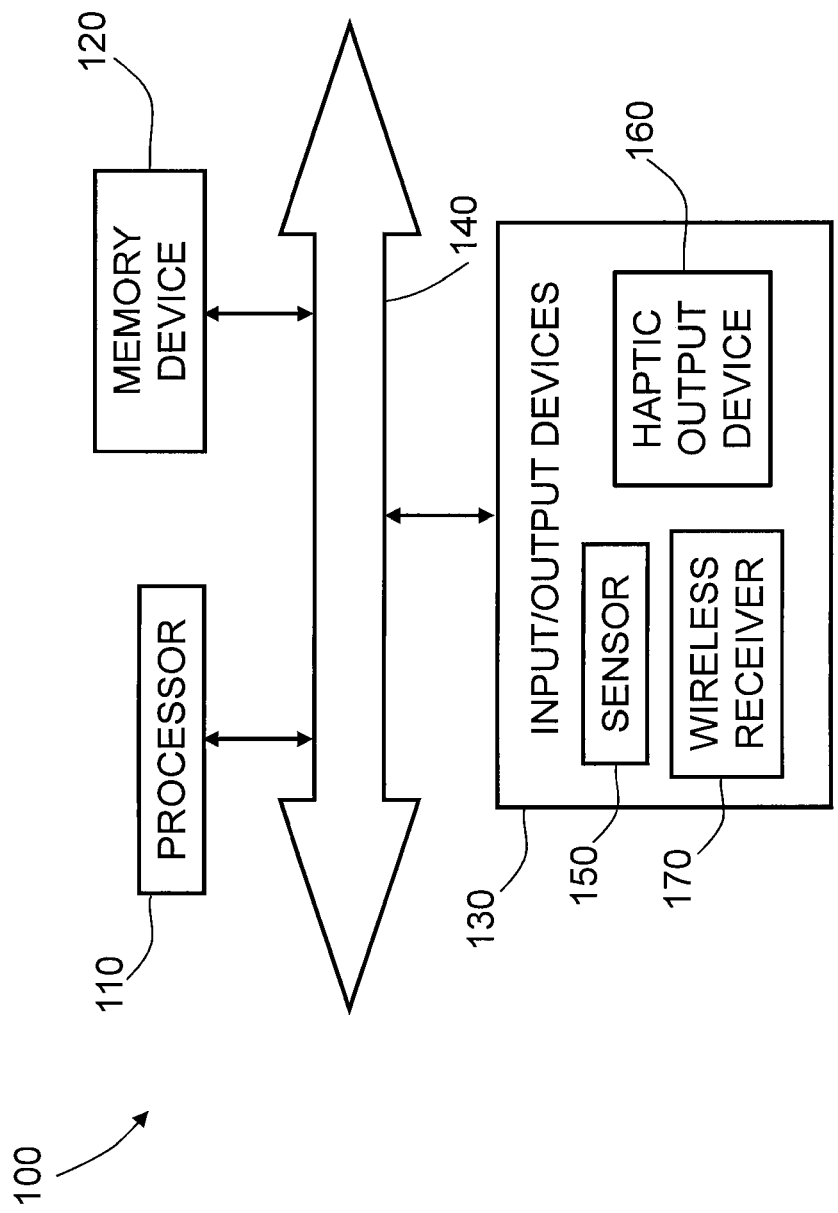
FIG. 1 schematically illustrates a system for a vehicle in accordance with an embodiment of the invention.

FIG. 1 is a schematic illustration of a system 100 in accordance with an embodiment of the invention. The system 100 may be part of an electronic device, such as a desktop computer, laptop computer, electronic workbook, electronic handheld device (such as a mobile phone, smart phone, gaming device, personal digital assistant ("PDA"), portable e-mail device, portable Internet access device, calculator, etc.), game controller, or wearable device, for example, or the system 100 may be integrated into a larger mechanical apparatus, such as a vehicle, as described in further details below. As illustrated, the system 100 includes a processor 110, a memory device 120, and input/output devices 130, which are interconnected via a bus 140. In an embodiment, the input/output devices 130 may include at least one sensor 150, at least one haptic output device 160, at least one wireless receiver 170 and/or other input/output devices.

The processor 110 may be a general-purpose or specific-purpose processor or microcontroller for managing or controlling the operations and functions of the system 100. For example, the processor 110 may be specifically designed as an application-specific integrated circuit ("ASIC") to control output signals to a user of the input/output devices 130, such as a driver of a vehicle, to provide haptic feedback or effects. The processor 110 may be configured to decide, based on predefined factors, what haptic feedback or effects are to be generated based on a haptic signal received or determined by the processor 110, the order in which the haptic effects are generated, and the magnitude, frequency, duration, and/or other parameters of the haptic effects. The processor 110 may also be configured to provide streaming commands that can be used to drive the haptic output device 160 for providing a particular haptic effect. In some embodiments, the processing device 110 may actually include a plurality of processors, each configured to perform certain functions within the system 100. The processor 110 is described in further detail below.

The memory device 120 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 160 of the input/output devices 130 are to be driven, or other information for generating haptic feedback or effects.

The bus 140 may be configured to allow signal communication between the various components of the system 100 and also to access information from remote computers or servers through, for example, a network. The network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The sensor 150 may include one or more of the following types of sensors. In an embodiment, the sensor 150 may include one or more strain gauge sensors configured to measure the magnitude of touch pressure between the user's body and various parts of the vehicle, such as the seat the user is sitting in, the steering wheel the user is manipulating, etc. In an embodiment, the sensor 150 may include a multi-touch pressure sensor configured to measure the pressure applied to each touch location within the vehicle. In an embodiment, the sensor 150 may include a force-sensitive resistor ("FSR") sensor configured to measure the force/stress applied the vehicle's control interface. In an embodiment, the sensor 150 may include a temperature, humidity, and/or atmospheric pressure sensor configured to measure environmental conditions, both inside and outside of the vehicle, as well as road conditions. In an embodiment, the sensor 150 may include a biometric sensor configured to capture a user's biometric measures, such as heart rate, etc. In an embodiment, the sensor 150 may include image sensors and/or a camera configured to capture a user's facial expressions and associated biometric information.

In an embodiment, the sensor 150 may include a proximity sensor configured to detect a presence of another vehicle in a vicinity of the vehicle that includes the sensor 150. For example, the sensor 150 may be an ultrasound sensor configured to sense another vehicle approaching the vehicle that includes the sensor 150 from behind and/or sense another vehicle in the driver's blind spot. Such sensors are already known in the art and are currently implemented in intelligent vehicles. In an embodiment, the sensor 150 may include a camera and image processor and is configured to sense the location of the vehicle relative to markers, such as lane lines, on the road on which the vehicle is traveling, as described in further detail below. In an embodiment, the sensor 150 may be configured to sense signals that are emitted by other vehicles or infrastructure that provide information about conditions related to the other vehicles or infrastructure, etc. Other sensors that are used in vehicles to sense a condition, surroundings, or environment of the vehicle may be used. For example, the sensor 150 may be in the form of a sensor that senses the speed of the vehicle, the speed of the vehicle relative to other vehicles in its vicinity, tire pressure, engine conditions, brake failure, etc. The above-described embodiments should not be considered to be limiting in any way.

The haptic output device 160 is configured to provide haptic feedback to the user of the system 100, such as the driver of a vehicle that includes the system 100. The haptic feedback may be created with any method of creating haptic effects, such as deformation, kinesthetic feedback or sensations, vibration, vibrotactile feedback electrostatic or ultrasonic friction, etc. In an embodiment, the haptic output device 160 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electro-static actuator, an electro-tactile actuator, and/or another type of actuator that provides a physical feedback such as a haptic (e.g., vibrotactile) feedback or kinesthetic feedback. In an embodiment, the haptic output device 160 may include non-mechanical or non-vibratory devices such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide projected haptic output such as a puff of air using an air jet, and so on. Multiple haptic output devices 160 may be used to generate different haptic effects, which may be used to create a wide range of effects such as deformations, vibrations, etc.

As described in further detail below, the haptic output device(s) 160 may be positioned in the vehicle such that surfaces in constant contact with or touched by the user may be moved or vibrated to provide the haptic feedback to the user. For example, haptic output devices 160 may be placed in the driver's seat of the vehicle and positioned to provide alerts, directional effects, etc., as described in further detail below. In embodiments of the invention, the haptic output device(s) 160 may be positioned at, i.e. in or on, the steering wheel, the driver's seatbelt, or any other surface the driver routinely comes into contact with while operating the vehicle, as described in further detail below.

The wireless receiver 170 may be configured to receive information that is being broadcasted from intelligent infrastructure on the road, or from traffic control stations, police cars, emergency vehicles, etc., to warn the driver about a hazardous condition, change in traffic conditions, severe weather, etc. Upon receipt of the information, the wireless receiver 170 may send an input signal to the processor 110 for further processing, as described below. In an embodiment, the wireless receiver 170 may be part of the sensor 150. The illustrated embodiment is not intended to be limiting in any way.

Figure 2:
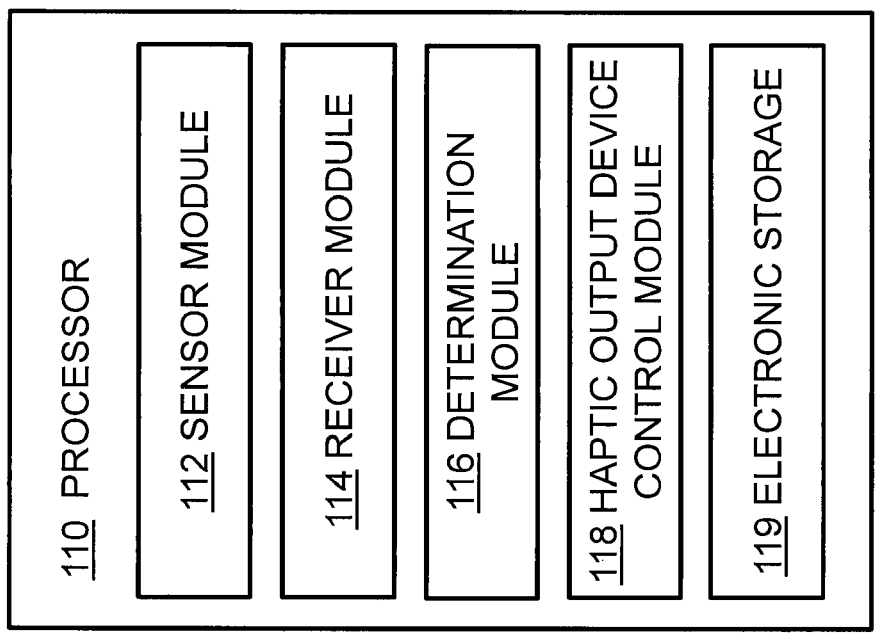
FIG. 2 schematically illustrates a processor of the system of FIG. 1.

FIG. 2 illustrates an embodiment of the processor 110 in more detail. The processor 110 may be configured to execute one or more computer program modules. The one or more computer program modules may include one or more of a sensor module 112, a receiver module 114, a determination module 116, a haptic output device control module 118, and/or other modules. The processor 110 may also include electronic storage 119, which may be the same as the memory device 120 or in addition to the memory device 120. The processor 110 may be configured to execute the modules 112, 114, 116 and/or 118 by software, hardware, firmware, some combination of software, hardware, and/or firmware, and/or other mechanisms for configuring processing capabilities on processor 110.

It should be appreciated that although modules 112, 114, 116 and 118 are illustrated in FIG. 2 as being co-located within a single processing unit, in embodiments in which the processor 110 includes multiple processing units, one or more of modules 112, 114, 116 and/or 118 may be located remotely from the other modules. The description of the functionality provided by the different modules 112, 114, 116 and/or 118 described below is for illustrative purposes, and is not intended to be limiting, as any of the modules 112, 114, 116 and/or 118 may provide more or less functionality than is described. For example, one or more of the modules 112, 114, 116 and/or 118 may be eliminated, and some or all of its functionality may be provided by other ones of the modules 112, 114, 116 and/or 118. As another example, the processor 110 may be configured to execute one or more additional modules that may perform some or all of the functionality attributed below to one of the modules 112, 114, 116 and/or 118.

The sensor module 112 is configured or programmed to receive an input signal from the sensor 150 that is generated when the sensor 150 detects a condition that the user should be made aware of. The condition may be related to a condition of the user, such as drowsiness of the user, a condition of the vehicle, such as the vehicle running too hot or running out of fuel, a tire pressure too low, a condition related to the vehicle's surrounding, such as an approaching vehicle, a vehicle in the user's blind spot, or an environmental condition, such as an slippery road on which the vehicle is travelling, etc. The sensor module 112 is also configured or programmed to send a signal to the determination module 116 for further processing.

The receiver module 114 is configured or programmed to receive an input signal from the wireless receiver 170 that is generated when the wireless receiver 170 receives information from a transmitter, as described above. The receiver module 114 is also configured or programmed to send a signal to the determination module 116 for further processing.

The determination module 116 is configured or programmed to determine what type of action is to be taken by the system 100 according to the input signal from the sensor 150 and/or the input signal from the wireless receiver 170, and what type of haptic feedback is to be generated by the haptic output device 160. The determination module 116 may be programmed with a library of sensor information available to the system 100 and corresponding haptic effect so that the determination module 116 may determine a corresponding output. In addition, the determination module 116 may also output a signal to the haptic output device control module 118 so that a suitable haptic effect may be provided to the user. The determination module 116 may also determine another action to be taken by the system, such as applying brakes if the sensor 150 senses that traffic ahead of the vehicle is slowing down or the wireless receiver 170 receives information about a traffic accident ahead, for example.

The haptic output device control module 118 is configured or programmed to determine a haptic control signal to output to the haptic output device 160, based on the signal generated by the determination module 116. Determining the haptic control signal may include determining one or more parameters that include an amplitude, frequency, duration, etc., of the haptic feedback that will be generated by the haptic output device 160 to provide the desired effect to the user.

Embodiments of the invention may take advantage of intelligent vehicle systems already implemented in many vehicles by using the sensors already present in such vehicles. In an embodiment, the user of the vehicle may have the option of turning the system 100 according to embodiments of the invention on or off. For example, the user may have the option to initiate the system 100 of the present invention for its continuous awareness functionality. Once the system is turned on, the system 100 constantly receives and processes information from the environment, including information concerning a position of or from other vehicles, road conditions, the vehicle's dynamic characteristics (e.g., velocity, acceleration, jerk, yaw, roll, pitch, etc.), and so forth. The system also captures the user's status (e.g., sitting posture, gestures, etc.), using one or multiple sensors 150 embedded in the vehicle's interior. In particular, pressure information may be captured using strain gauges or other force transducers, as described above. Depending on the user's input and/or information received, the system 100 may send a certain haptic output command to an organic/deformation haptic output device(s) 160 embedded in the vehicle. The haptic output device(s) 160 receive the command from the processor 110 and produce kinesthetic haptic feedback to the user. The system 100 is configured to monitor environmental information as well as the user's input, posture, and/or gestural interactions in a continuous manner, as long as the system 100 is in an on state.

Figure 3B:
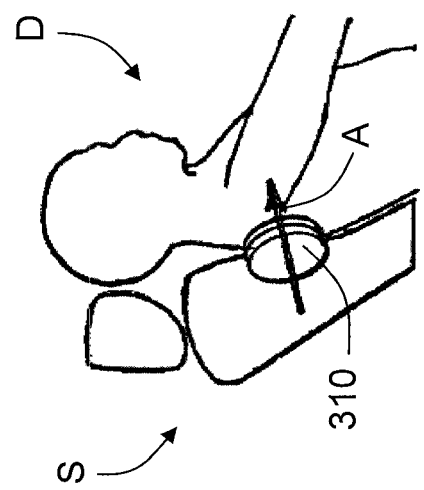
FIGS. 3A and 3B schematically illustrate an implementation of the system of FIG. 1.
Figure 3A:
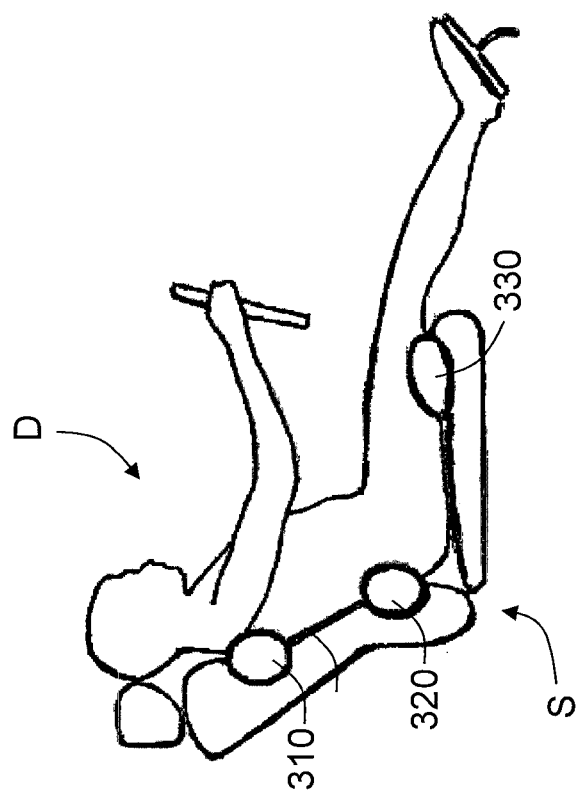

In an embodiment, a potential hazard level that is sensed by the sensor 150 or received by the wireless receiver 170 may be displayed by the haptic output device 160 through deformation/shape change haptic effects that are generated on a seat S of a driver D. In an embodiment, the haptic effect(s) may be displayed on the seat S at any arbitrary location on the seat S. In an embodiment, the system 100 may use a strain gauge or FSR type sensor 150 to locate one or more contact points between the driver's body and the seat S and display haptic effects only in the areas at or near the contact point(s). For example, as illustrated in FIG. 3A, a first haptic output device 310 may be located where the driver's D upper back and shoulders contact the seat, a second haptic output device 320 may be located where the driver's D lower back contacts the seat, such as where a lumbar support is located, and a third haptic output device 330 may be located near the edge of the seat where the driver's D upper legs rest on the seat. The haptic output devices 310, 320, 330 are schematically represented by ovals to indicate a range of deformations of the seat S that may be generated by the haptic output devices 310, 320, 330. The deformation generated by each of the haptic output devices 310, 320, 330 may display information in a continuous way without much annoyance to the driver and in an intuitive manner. For example, the magnitude of the deformation may be modulated based on the level and/or imminence of danger, with greater deformation, indicated by arrow A in FIG. 3B, corresponding to greater or more imminent danger. In an embodiment, the kinesthetic haptic effects may be combined with vibrotactile feedback to enrich the information being conveyed. Continuous situational awareness through deformation may allow the driver D to be aware of how alert and ready to react he or she should be at each instance in time. Instead of one-time alerts that are used in current implementations of warning systems in cars that are displayed only when a threat is imminent (by which time it might be already too late), the level of danger, and more importantly, how alert the driver should be, may be continuously transferred to the user via the haptic output devices 310, 320, 330.

Figure 4A:
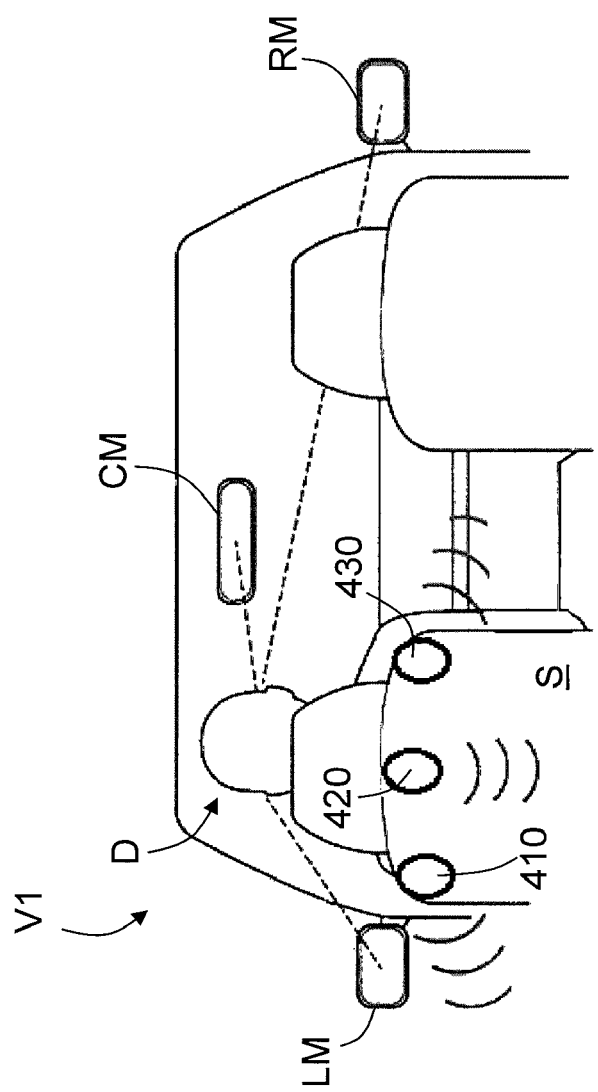
FIGS. 4A and 4B schematically illustrate an implementation of the system of FIG. 1.

In some driving situations, there may be asymmetry among the parts of the road (left, right, behind, front, etc.) to which the driver should be paying attention. In an embodiment, the system 100 is configured to convey spatial information through haptic output devices 160 that generate deformation, i.e. kinesthetic, haptic effects that may be used to keep the driver aware and guide his or her attention to a specific part of the road, or specific direction, in a continuous manner. By focusing the attention of the driver, even though the level of required attention might be relatively low, on a certain part of the road, the awareness of the driver and his or her capacity to react to incidents may be optimized. For example, as illustrated in FIG. 4A, the system 100 may include a first haptic output device 410 located in the driver's seat S near the location of the driver's D left shoulder, a second haptic output device 420 located in the driver's seat S near the location of the center of the driver's D upper back, and a third haptic output device 430 located in the driver's seat S near the location of the driver's D right shoulder. Although the driver D may use the left LM, center CM, and right RM rear view mirrors to keep track of the surroundings of the vehicle, such as vehicles approaching from behind or a vehicle that is being passed or a vehicle that is passing the driver's vehicle, the haptic output devices 410, 420, 430 may be used to provide haptic cues to the driver D in case the driver D becomes distracted.

Figure 4B:
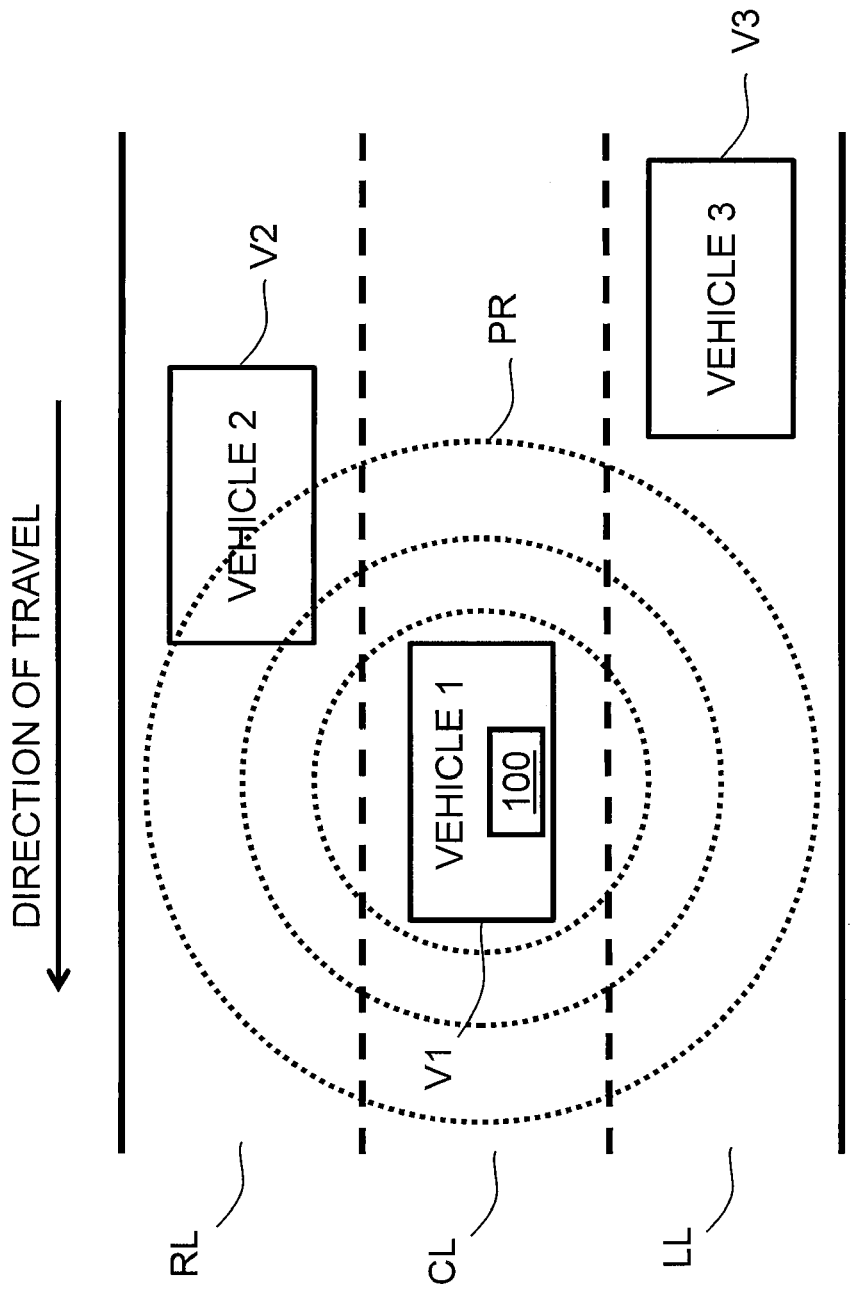

For example, FIG. 4B illustrates a vehicle V1 that includes the system 100 according to embodiments of the invention travelling in a center lane CL of a road, a second vehicle V2 travelling in a right lane RL of the road, and a third vehicle V3 travelling in a left lane LL of the road. At least one sensor 150 of the system 100 is configured to sense whether the other vehicles V2, V3 are within a predetermined range PR of the vehicle V1 having the system 100, as indicated by the concentric circles illustrated in FIG. 4B. As the second vehicle V2 in the right lane RL gets closer to the vehicle V1, the third haptic output device 430 may increase the deformation being provided to the seat S so that the driver D can "feel" the presence of the vehicle V2. Similarly, as the second vehicle V2 in the right lane RL becomes farther away from the vehicle V1, the third haptic output device 430 may decrease the amount of deformation being provided to the seat S until the second vehicle V2 is no longer within the predetermined range PR of the vehicle V1. The first haptic output device 410 may be actuated when the third vehicle V3 approaches the vehicle V1 and enters the predetermined range PR. The amount of deformation provided to the seat S by the first haptic output device 410 may increase as the third vehicle V3 gets closer to the vehicle V1 and decrease as the third vehicle V3 gets farther away from the vehicle V1. Similarly, the second haptic output device 420 may be used to alert the driver D that a vehicle (not shown) is approaching the driver's vehicle V1 from directly behind in the center lane CL. Such haptic feedback may provide the driver D with information that the driver D may not perceive by vision alone, especially if the driver D is distracted at the time another vehicle is approaching the driver's vehicle V1.

Figure 5A:
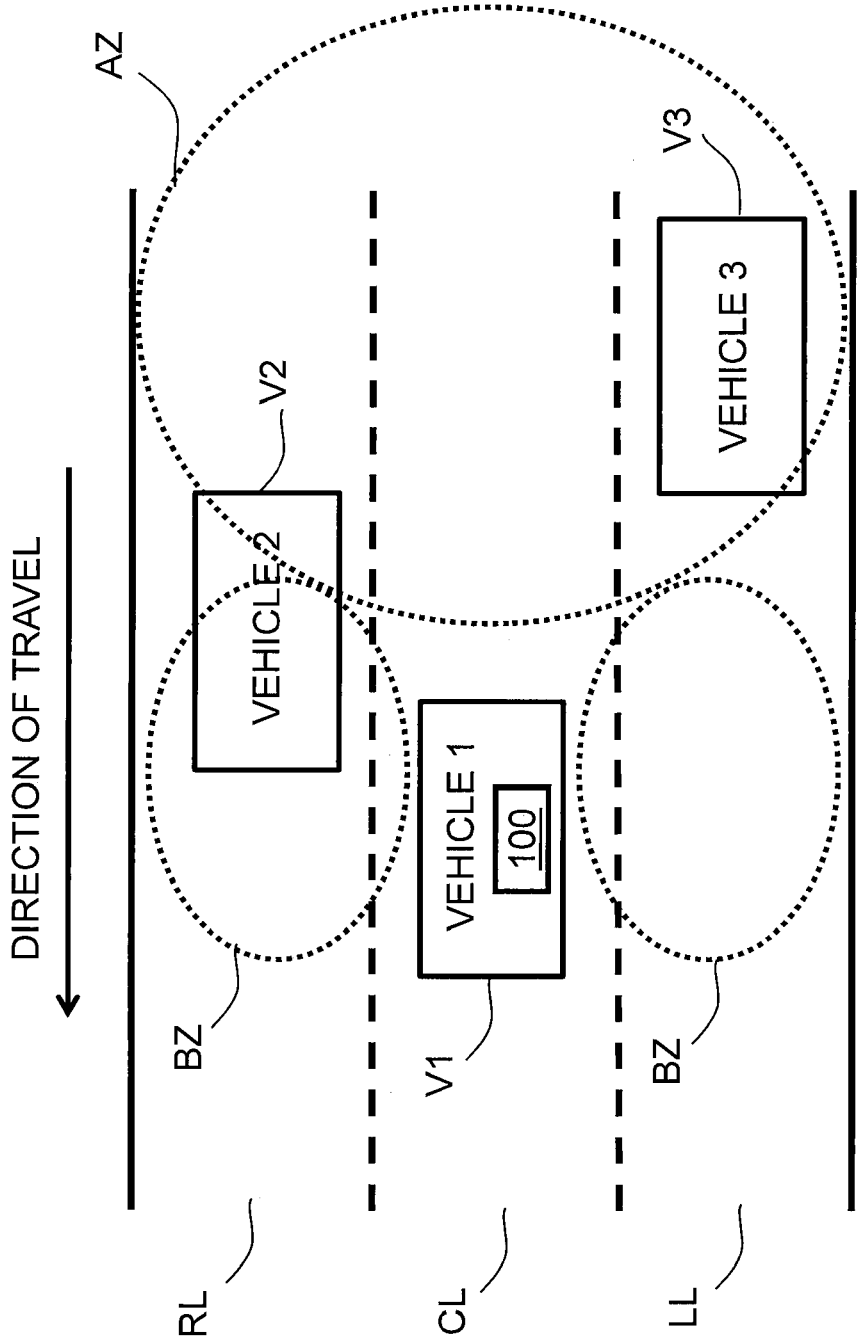
FIGS. 5A-5C schematically illustrate an implementation of the system of FIG. 1.
Figure 5C:
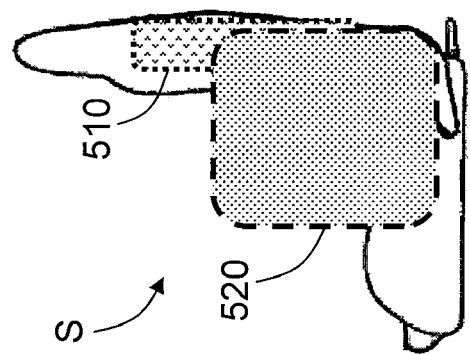
Figure 5B:
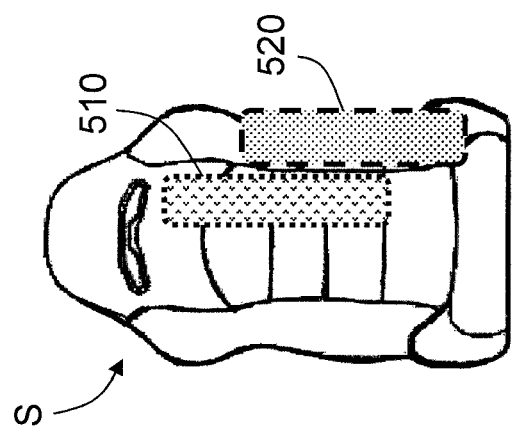

In an embodiment, the system 100 is configured to display information about the location of vehicles V2, V3 in the vicinity of the vehicle V1 that includes the system 100 through different contact points between the user's body and the vehicle's interior. For example, FIG. 5A illustrates different zones relative to the vehicle V1 with the system 100, including an approaching zone AZ, i.e. the zone that an approaching vehicle, such as vehicle 3, enters just before entering the driver's blind spot, and a blind spot zone BZ that encompasses the driver's blind spot. In this embodiment, the driver may feel the presence of a vehicle V3 in the approaching zone AZ on the back of the seat S via the haptic feedback that is generated by a first haptic output device 510 that is located in back of the seat S, as illustrated in FIGS. 5B and 5C. The schematic representation of the first haptic output device 510 illustrates a range in which the haptic feedback generated by the first haptic output device 510 or an array of first haptic output devices may be displayed. The seat S may include a second haptic output device 520 that is located in a left side or handle of the seat S, such that the haptic feedback may cease to be generated by the first haptic output device 510 and start to be generated by the second haptic output device 520 such that the haptic feedback is shifted towards the left side or handle of the seat S as the vehicle V3 enters into the blind spot zone BZ on the left side of the vehicle V1. The schematic representation of the second haptic output device 520 illustrates a range in which the haptic feedback generated by the second haptic output device 520 or an array of second haptic output devices may be displayed. As the approaching vehicle V3 passes by, continuation of the body-mediated haptic effects may be displayed on a front side of driver's body through a seat belt, for example. By including a third haptic output device (not shown) in a right side or handle of the seat S, similar effects may be generated as the vehicle V1 passes a vehicle V2 in the right lane RL such that haptic feedback may be generated by the third haptic output device to the driver when the vehicle V2 is in the driver's blind spot zone BZ on the right side of the vehicle V1. The haptic feedback may shift to the back of the seat S by generating haptic feedback with the first haptic output device 510 when the distance between the vehicle V1 and the passed vehicle V2 is safe for the driver to steer the vehicle V1 into the right lane RL at a safe distance ahead of the vehicle V2. This arrangement may be used to build a mental model for the user/driver where the vehicle V1 and its surroundings are perceived as a haptics extension of the user's body. Creating an intuitive sense of the location, approaching pattern and/or relative distance of the vehicles in the vicinity may provide a sense about the surroundings and may significantly improve the driver's ability to react, if needed.

In an embodiment, the system 100 may be configured to provide haptic effects to various components of the vehicle in a way that the driver may receive an overall perception of the actual and meta data related to the road and its surroundings, e.g., the road surface, road markers, such as broken vs. continuous lines, vehicles in the vicinity, vehicle dynamics (e.g., turning, skidding), environmental conditions, etc. Haptic effects may be displayed on any part of the vehicle that the driver routinely comes into contact with, such as the seat, armrest, floor mat, door, etc. Induced haptic effects may also be displayed on various parts of the driver's body that may or may not be in direct contact with the interior of the vehicle. For example, in an embodiment, the haptic output device 160 may be part of a wearable device that is not typically in contact with the vehicle, but worn by the driver, such as a hat, a headband, a bracelet, a watch, a necklace, clothing, etc.

Figure 6B:
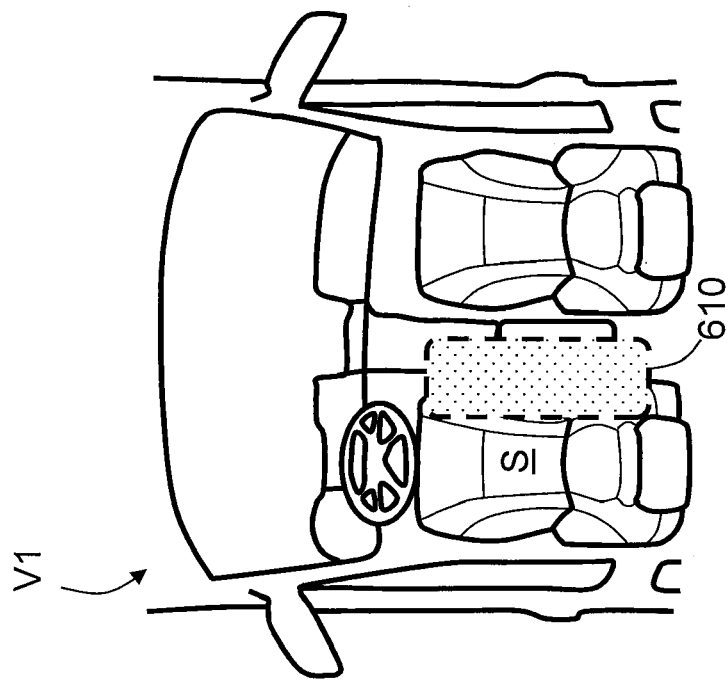
FIGS. 6A and 6B schematically illustrate an implementation of the system of FIG. 1.
Figure 6A:
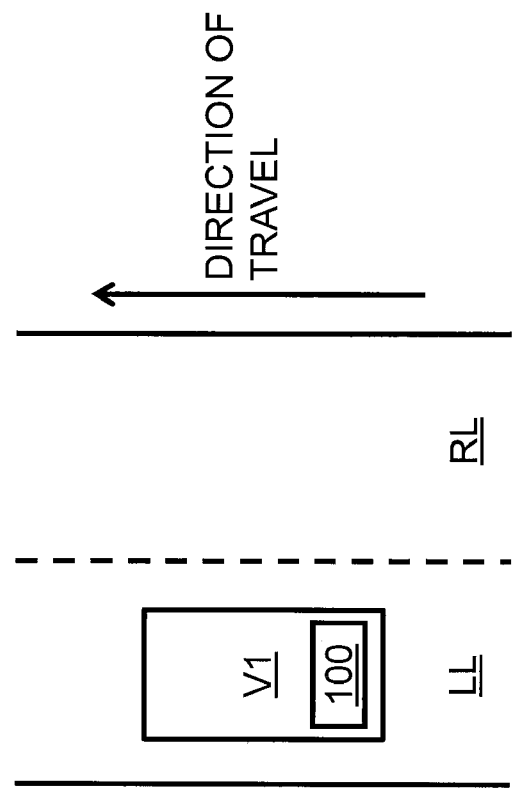

FIG. 6A illustrates a vehicle V1 with the system 100 that is configured to display the existence of another vehicle V2 on the right side of the driver's vehicle V1. As schematically illustrated in FIG. 6B, a haptic output device 610 or an array of haptic output devices may be embedded in a right side or handle of the driver's seat or in an arm rest that the driver routinely places his or her arm on. The schematic representation of the haptic output device 610 illustrates a range in which the haptic feedback generated by the haptic output device 610 or an array of haptic output devices may be displayed. By generating haptic feedback to the user in the form of kinesthetic feedback, the driver may feel the presence of the vehicle V2 in an unobtrusive manner.

Figure 7B:
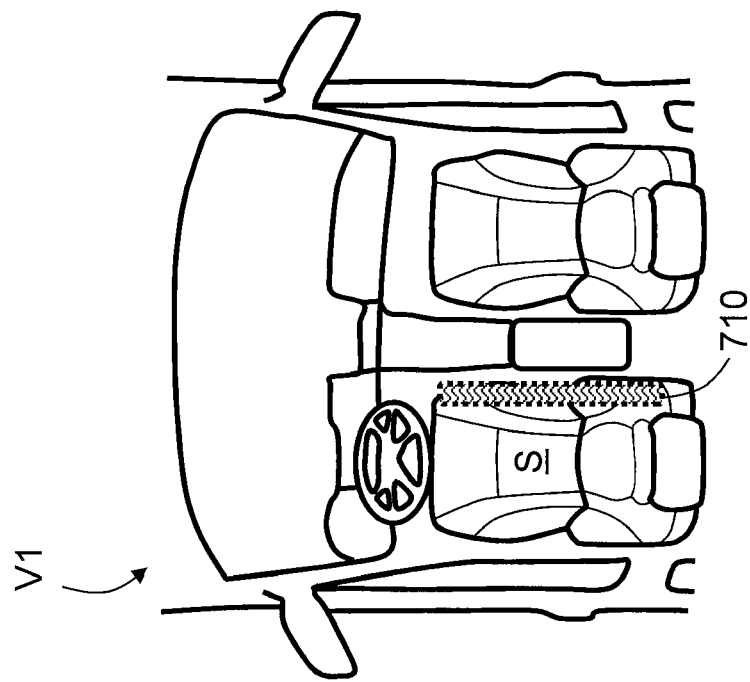
Figure 7A:
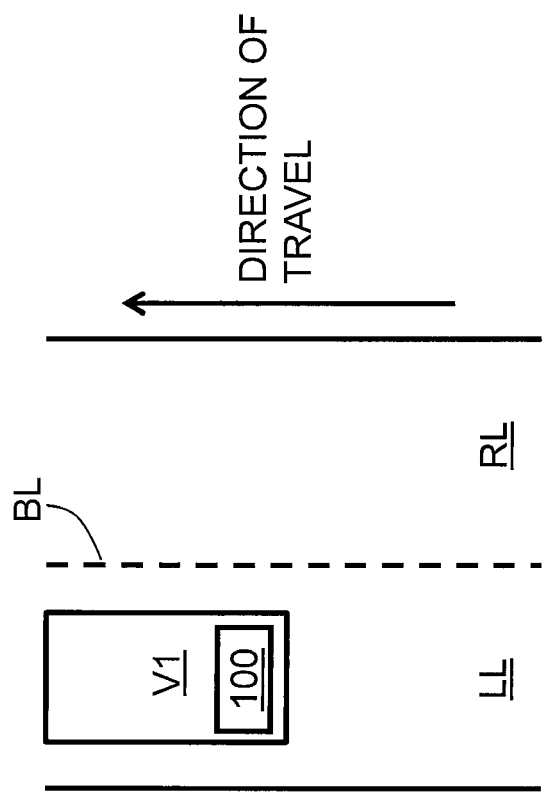
Figure 8B:
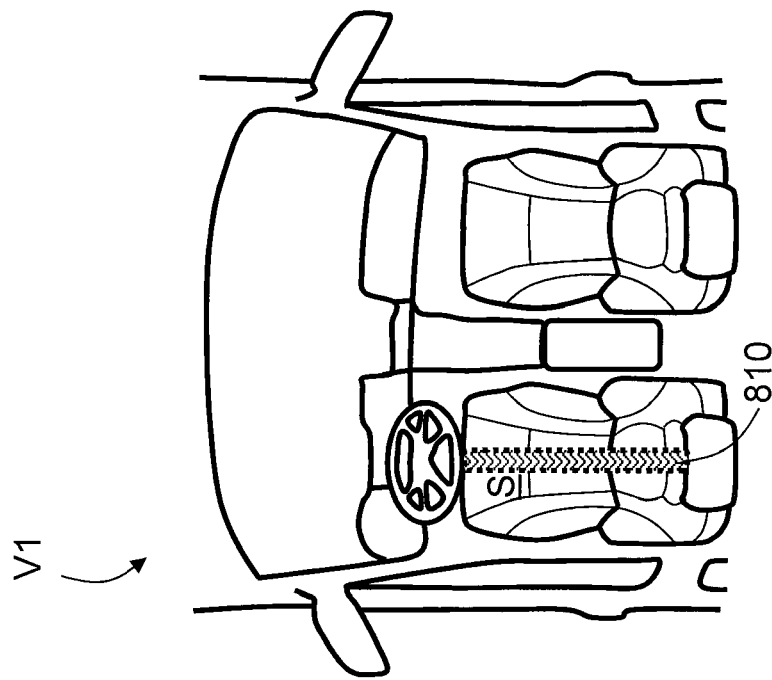
Figure 8A:
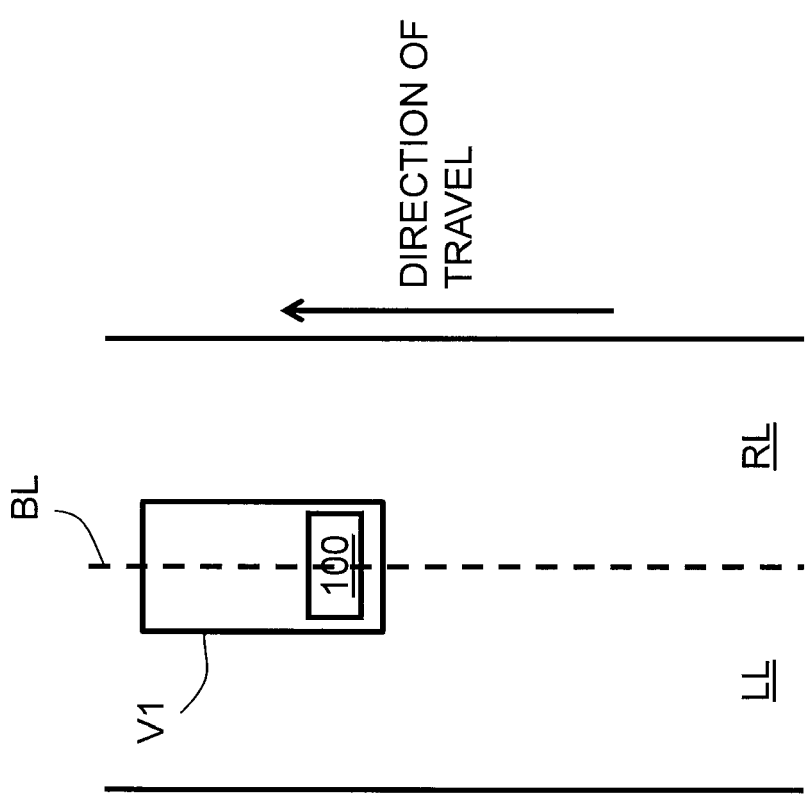

FIGS. 7A, 8A and 9A schematically illustrates a vehicle V1 that includes the system 100 passing over a road marker, such as a broken line BL, as the vehicle V1 moves from the left lane LL to the right lane RL of a road. FIGS. 7B, 8B and 9B schematically illustrate a part of the interior of the vehicle V1 at the moments in time illustrated in FIGS. 7A, 8A, and 9A, respectively. As illustrated in FIGS. 7B, 8B and 9B, a first haptic output device or an array of first haptic output devices 710 is located in a right side of the driver's seat S (FIG. 7B), a second haptic output device or an array of second haptic output devices 810 is located in a center of the driver's seat S (FIG. 8B), and a third haptic output device or an array of third haptic output devices 910 (FIG. 9B) is located in a left side of the driver's seat S. Meta data corresponding to passing over the broken line BL may be haptically conveyed to the driver by only actuating the first haptic output device(s) 710 when the broken line BL is still on the right hand side of the vehicle V1, only actuating the second haptic output device(s) 810 when the vehicle V1 is centered on the broken line BL, and then only actuating the third haptic output device(s) 910 when the broken line BL is on the left hand side of the vehicle V1. In an embodiment, the deformation that is generated by the haptic output 160 may be in the form of an actuator that may physically move from the right side to the left side of the seat and vice-versa. For example, a solenoid may be installed on a linear guide that extends across the seat. The solenoid may exert forces on the driver's body from under the seat and at the same time, the solenoid may be pushed across the guide using another linear actuator. Embodiments of the invention may provide an intuitive yet complete map of the road and/or vehicle's surrounding and offer a powerful way to significantly increase the driver's awareness of surrounding situations without introducing much additional cognitive load.

Figure 10:
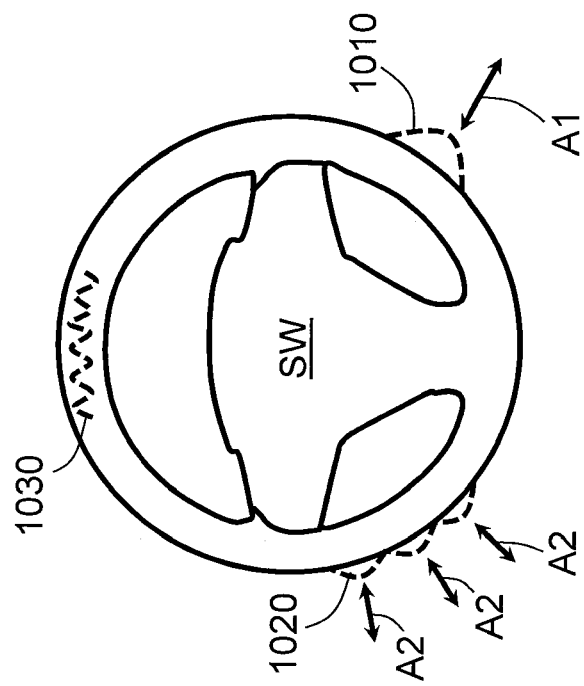
FIG. 10 schematically illustrates an implementation of the system of FIG. 1.

Information about the surroundings as well as need for driver's alertness may be translated, in a continuous manner, in the form of kinesthetic haptic feedback through deformation or change of material properties of a steering wheel SW, illustrated in FIG. 10, of a vehicle having the system 100 according to embodiments of the invention. The kinesthetic haptic feedback may be realized in a variety of ways. For example, the steering wheel SW may include a first haptic output device 1010 that is configured to generate a single deformation point, as illustrated by arrow A1, and/or a second haptic output device(s) 1020 configured to generate multiple deformation points with spatiotemporal patterns, as illustrated by arrows A2, and/or a third haptic output device 1030 configured to generate changes in stiffness/softness/material properties of the contact point between driver's hand and the steering wheel SW. In this embodiment, continuous flow of information may be translated into kinesthetic haptic effects and/or vibrotactile haptic effects in a continuous fashion, without potential annoyance and/or adaptation issues that may be caused by conventional vibrotactile feedback.

Figure 11:
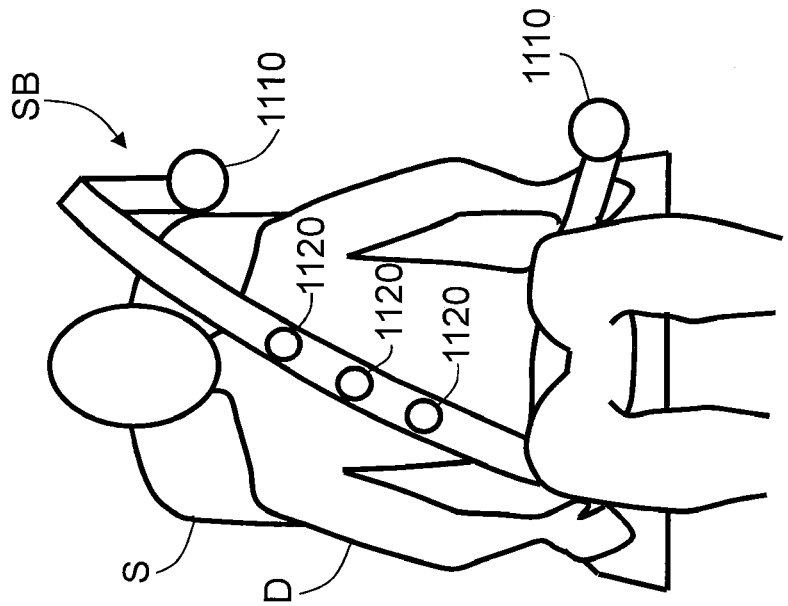
FIG. 11 schematically illustrates an implementation of the system of FIG. 1.

In an embodiment, one or more haptic output devices may be attached to or embedded in a seat belt SB and configured to generate kinesthetic and/or vibrotactile feedback to the driver. As illustrated in FIG. 11, one or more haptic output devices 1110 may be part of a pulling force control mechanism that already exists in many seat belts, and may be configured to convey kinesthetic feedback by adjusting the tension in the seat belt SB. Additional haptic output devices 1120 that are configured to generate vibrotactile feedback may be embedded in or attached to the seat belt SB to provide vibrotactile feedback in addition to the kinesthetic feedback provided by the haptic output devices 1110. Information such as alerts and environmental data may be displayed through such an interface in a continuous manner. In embodiments described above that include haptic output devices in the seat S that provide haptic effects on driver's back and sides, the addition of haptic output devices 1110, 1120 to the seat belt SB, which display haptics on the driver's chest and legs, may offer a powerful mechanism to display spatial and body-mediated haptics on the driver, and also provide information related to a condition in front of the driver's vehicle.

FIG. 12 schematically illustrates a method 1200 according to an embodiment of the invention. The method 1200 starts at 1210 in which the functionality of the system 100 described above is turned on. At 1220, information associated with a vehicle's surroundings, environment and/or condition is sensed by the sensor 150. At 1230, the processor 110 analyzes and processes data received from the sensor 150. In an embodiment, another sensor 150 may sense relevant information associated with the driver's safety or situational awareness, such as whether the driver is becoming drowsy. At 1240, the processor 110 translates the information into haptic cues to be displayed to the user/driver through the haptic output device(s) 160 by determining the haptic feedback to generate to the driver based on the sensed information, generates a haptic control signal, and outputs the haptic control signal to the haptic output device(s) 160. At 1250, the haptic output device 160 generates the haptic feedback based on the haptic control signal received from the processor 110. The method 1200 repeats steps 1220-1250 as long as the system 100 is on. The method 1200 ends at 1260 when the system 100 is turned off.

Embodiments of the invention described above may provide sensory augmentation in driving interactions to increase the driver's awareness of surrounding situations and improve safety. Embodiments of the invention described above offer an effective way to communicate information with the driver on a continuous basis, without causing mental overload or annoyance. Embodiments of the invention described above provide new implementations of haptic feedback and effects to enhance and enrich driving scenarios and improve a driver's safety. Embodiments of the invention described above take advantage of a variety of sensory information increasingly available in commercial vehicles. Embodiments of the invention described above provide systems and methods for implementing haptic organic user interfaces to achieve enhanced continuous awareness for intelligent vehicles.

The embodiments described herein represent a number of possible implementations and examples and are not intended to necessarily limit the present disclosure to any specific embodiments. Various modifications can be made to these embodiments as would be understood by one of ordinary skill in the art. Any such modifications are intended to be included within the spirit and scope of the present disclosure and protected by the following claims.

What is claimed is:

1. A system for a vehicle, the system comprising:
   a sensor configured to sense information associated with surroundings of the vehicle, an environment of the vehicle, and/or a condition of the vehicle, and to output a sensor signal based on the information, wherein the information includes a location relative to the vehicle of a marker on a road on which the vehicle is travelling;
   a processor configured to receive the sensor signal, determine haptic feedback for the system based on the sensor signal, and output a haptic control signal; and
   a haptic output device configured to receive the haptic control signal from the processor and generate the haptic feedback based on the haptic control signal, wherein the haptic feedback comprises a kinesthetic haptic effect whose output location moves to indicate movement of the location of the marker relative to the vehicle.

2. The system according to claim 1, wherein the haptic output device is disposed in a wearable device that is a watch, or is disposed in a seat of the vehicle.

3. The system according to claim 1, wherein the information sensed by the sensor further comprises a location of a second vehicle relative to the vehicle.

4. The system according to claim 3, wherein the haptic feedback further comprises additional kinesthetic feedback whose output location moves to indicate the location of the second vehicle relative to the vehicle.

5. The system according to claim 1, further comprising a seat in the vehicle, wherein the haptic output device is disposed in the seat, and the output location of the kinesthetic haptic effect is moved on the seat to indicate the movement of the location of the marker relative to the vehicle, wherein the marker comprises lane lines on the road.

6. The system according to claim 1, wherein the haptic output device is disposed in a wearable device selected from the group consisting of a hat, a headband, a bracelet, a necklace, and clothing.

7. The system according to claim 1, further comprising an additional sensor configured to sense a condition associated with a user of the vehicle.

8. The system according to claim 7, wherein the additional sensor is a biometric sensor.

9. The system according to claim 7, wherein the processor is configured to receive an additional sensor signal from the additional sensor and is configured to monitor drowsiness, and wherein the processor is configured to send an additional haptic signal when the processor determines that the drowsiness exceeds a predetermined level.

10. The system according to claim 7, further comprising an image sensor configured to capture facial expressions.

11. A method comprising:
    receiving information regarding a vehicle's surroundings, environment, and/or condition;
    detecting presence of a danger to the vehicle based on the information regarding the vehicle's surroundings, environment, and/or condition;
    causing a haptic output device of the vehicle to continuously output a deformation on a surface in the vehicle based on the information regarding the vehicle's surroundings, environment, and/or condition, such that the deformation is output both when an imminence level of the danger is increasing and when an imminence level of the danger is decreasing, wherein the deformation is continuously modified based on the imminence level of the danger.

12. The method according to claim 11, wherein the haptic output device is disposed in a wearable device that is selected from a group consisting of: a hat; a headband; a bracelet; a necklace; and/or clothing, or is disposed in a seat of the vehicle.

13. The method according to claim 11, wherein the haptic output device is disposed in a wearable device that is a watch.

14. The method according to claim 11, wherein the information is received from at least one sensor sensing a location of a second vehicle relative to the vehicle, and wherein causing the haptic output device to continuously output the deformation based on the information regarding the vehicle's surroundings, environment, and/or condition comprises:

increasing an amount of deformation as the second vehicle gets closer to the vehicle, and decreasing the amount of deformation as the second vehicle gets farther from the vehicle.

15. The method according to claim 11, wherein the information is received from at least one sensor sensing a location of a marker on a road on which the vehicle is travelling relative to the vehicle.

16. The method according to claim 11, wherein the step of receiving information comprises receiving information regarding a condition associated with a user of the vehicle.

17. The method according to claim 16, wherein the step of receiving information regarding a condition associated with a user of the vehicle comprises using a biometric sensor.

18. The method according to claim 16, wherein the step of receiving information regarding a condition associated with a user of the vehicle comprises capturing facial expressions of the user.

19. The method according to claim 16, wherein the step of receiving information regarding a condition associated with a user of the vehicle comprises sensing drowsiness of the user, and the method further comprises generating additional haptic feedback when the drowsiness exceeds a predetermined level.

20. The method according to claim 11, wherein the information regarding the vehicle's surroundings, environment, and/or condition comprises at least one of a tire pressure, an engine condition, and a brake condition of the vehicle, the haptic feedback being further based on the at least one of a tire pressure, engine condition, and brake condition of the vehicle.

21. A method comprising:
receiving information regarding a location relative to a vehicle of a marker on a road on which the vehicle is travelling;
determining haptic feedback to generate based on the information received and generating a haptic control signal with a processor; and
generating the haptic feedback with a haptic output device based on the haptic control signal generated by the processor, wherein the haptic feedback comprises a kinesthetic haptic effect whose output location moves to indicate movement of the location of the marker relative to the vehicle.

22. The method according to claim 21, further comprising receiving information regarding a condition associated with a user of the vehicle via a biometric sensor.

23. The method according to claim 22, wherein the step of receiving information regarding a condition associated with a user of the vehicle further comprises capturing facial expressions of the user.

24. The method according to claim 22, wherein the step of receiving information regarding a condition associated with a user of the vehicle further comprises sensing drowsiness of the user, and the method further comprises generating additional haptic feedback when the drowsiness exceeds a predetermined level.

* * * * *